(12) United States Patent
Ikeda

(10) Patent No.: US 11,473,648 B2
(45) Date of Patent: Oct. 18, 2022

(54) TOOTHED BELT TRANSMISSION DEVICE

(71) Applicant: Mitsuboshi Belting Ltd., Kobe (JP)

(72) Inventor: Makoto Ikeda, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 378 days.

(21) Appl. No.: 16/617,610

(22) PCT Filed: May 29, 2018

(86) PCT No.: PCT/JP2018/020622
§ 371 (c)(1),
(2) Date: Nov. 27, 2019

(87) PCT Pub. No.: WO2018/221538
PCT Pub. Date: Dec. 6, 2018

(65) Prior Publication Data
US 2020/0182329 A1    Jun. 11, 2020

(30) Foreign Application Priority Data

May 30, 2017 (JP) .............................. JP2017-106153
May 18, 2018 (JP) .............................. JP2018-096312

(51) Int. Cl.
*F16G 1/28* (2006.01)
*F16H 7/02* (2006.01)

(52) U.S. Cl.
CPC ........ *F16G 1/28* (2013.01); *F16H 7/02* (2013.01)

(58) Field of Classification Search
CPC ..... F16G 1/10; F16G 1/28; F16G 1/08; F16H 7/023

USPC ........................................................ 474/205
See application file for complete search history.

(56) References Cited

U.S. PATENT DOCUMENTS

| 4,108,011 | A | * | 8/1978 | Gregg | ....................... F16G 1/28 474/153 |
| 4,427,403 | A | * | 1/1984 | Kanamori | ................. F16G 1/28 474/205 |
| 5,536,214 | A | * | 7/1996 | Akita | ........................ F16G 1/28 474/268 |
| 5,741,197 | A | | 4/1998 | Akita et al. | |

(Continued)

FOREIGN PATENT DOCUMENTS

| CA | 2707629 A1 | 6/2009 |
| CA | 2917984 A1 | 3/2015 |

(Continued)

OTHER PUBLICATIONS

Jul. 20, 2021—(KR) Office Action—App 10-2019-7034938.

(Continued)

*Primary Examiner* — Henry Y Liu
(74) *Attorney, Agent, or Firm* — Banner & Witcoff, Ltd.

(57) ABSTRACT

This toothed belt transmission device (1) includes a toothed belt (10) in which belt teeth (13) and belt tooth bottom parts (14) are alternately formed, and a toothed pulley (50) in which pulley teeth (53) and pulley tooth bottom parts (54) are alternately formed so as to mesh with the toothed belt (10). The tips of the belt teeth (13) come into contact with the pulley tooth bottom parts (54), but the tips of the pulley teeth (53) do not come into contact with the belt tooth bottom parts (14), and gaps (S) are provided between the tips of the pulley teeth (53) and the belt tooth bottom parts (14).

9 Claims, 4 Drawing Sheets

(56) References Cited

U.S. PATENT DOCUMENTS

| | | | | |
|---|---|---|---|---|
| 8,297,401 | B1* | 10/2012 | Schneider | B62D 5/0412 |
| | | | | 180/443 |
| 8,312,959 | B1* | 11/2012 | Schneider | B62D 5/0412 |
| | | | | 180/443 |
| 8,327,972 | B1* | 12/2012 | Schneider | B62D 5/0412 |
| | | | | 180/443 |
| 2009/0275433 | A1* | 11/2009 | Gaynor | F16H 55/171 |
| | | | | 474/153 |
| 2011/0269589 | A1* | 11/2011 | Schleicher | F16G 1/28 |
| | | | | 474/205 |
| 2013/0181177 | A1* | 7/2013 | Moll | B66D 1/36 |
| | | | | 254/338 |
| 2013/0294872 | A1* | 11/2013 | Hori | G11B 15/6835 |
| | | | | 414/280 |
| 2014/0206487 | A1* | 7/2014 | Tomobuchi | C08J 5/046 |
| | | | | 474/205 |
| 2014/0287862 | A1* | 9/2014 | Yamada | F16G 1/28 |
| | | | | 474/204 |
| 2015/0005123 | A1* | 1/2015 | Di Meco | F16G 9/04 |
| | | | | 474/205 |
| 2015/0152941 | A1* | 6/2015 | Sekiguchi | B62D 5/04 |
| | | | | 474/205 |
| 2016/0060077 | A1* | 3/2016 | Haapaniemi | B66B 9/00 |
| | | | | 187/255 |
| 2016/0069420 | A1* | 3/2016 | Sekiguchi | F16G 1/10 |
| | | | | 264/157 |
| 2016/0084358 | A1* | 3/2016 | Yuan | F16H 9/24 |
| | | | | 474/148 |
| 2016/0208889 | A1* | 7/2016 | Yoshida | B32B 3/30 |
| 2016/0221637 | A1* | 8/2016 | Osaki | F16H 7/02 |
| 2016/0281818 | A1* | 9/2016 | Newsome | F16G 1/10 |
| 2017/0248208 | A1* | 8/2017 | Tamura | F16G 1/16 |

FOREIGN PATENT DOCUMENTS

| | | |
|---|---|---|
| CN | 2114727 U | 9/1992 |
| CN | 102016354 A | 4/2011 |
| CN | 104159714 A | 11/2014 |
| DE | 2706338 A1 | 8/1977 |
| DE | 19625832 A1 | 1/1998 |
| JP | S58-036655 U | 3/1983 |
| JP | S62-088842 A | 4/1987 |
| JP | H07-158700 A | 6/1995 |
| JP | 2002-098202 A | 4/2002 |
| JP | 2010-096229 A | 4/2010 |
| JP | 2012-215248 A | 11/2012 |
| JP | 5204611 B2 | 6/2013 |
| JP | 2016-090052 A | 5/2016 |
| JP | 2016-211734 A | 12/2016 |

OTHER PUBLICATIONS

Jan. 25, 2021—(EP) Extended Search Report—App 18809516.0.
Mar. 10, 2020—(JP) Notification of Reasons for Refusal—App 2018-096312.
Dec. 8, 2020—(CA) Office Action—App 3,060,173.
Dec. 28, 2020—(KR) Office Action—App 10-2019-7034938.
Sep. 3, 2020—(CN) Notification of First Office Action—App 201880031332.2.
Sep. 29, 2020—(JP) Notification of Reasons for Refusal—App 2018-096312.
Shigley, Joseph E. "Standard Handbook of Machine Design", p. 1042, 1993.8.
Apr. 1, 2021—(CN) Notification of the Second Office Action—App 201880031332.2.
Aug. 28, 2018—International Search Report—Intl App PCT/JP2018/020622.
Jan. 29, 2019 (TW) Office Action—App 107118420.

* cited by examiner

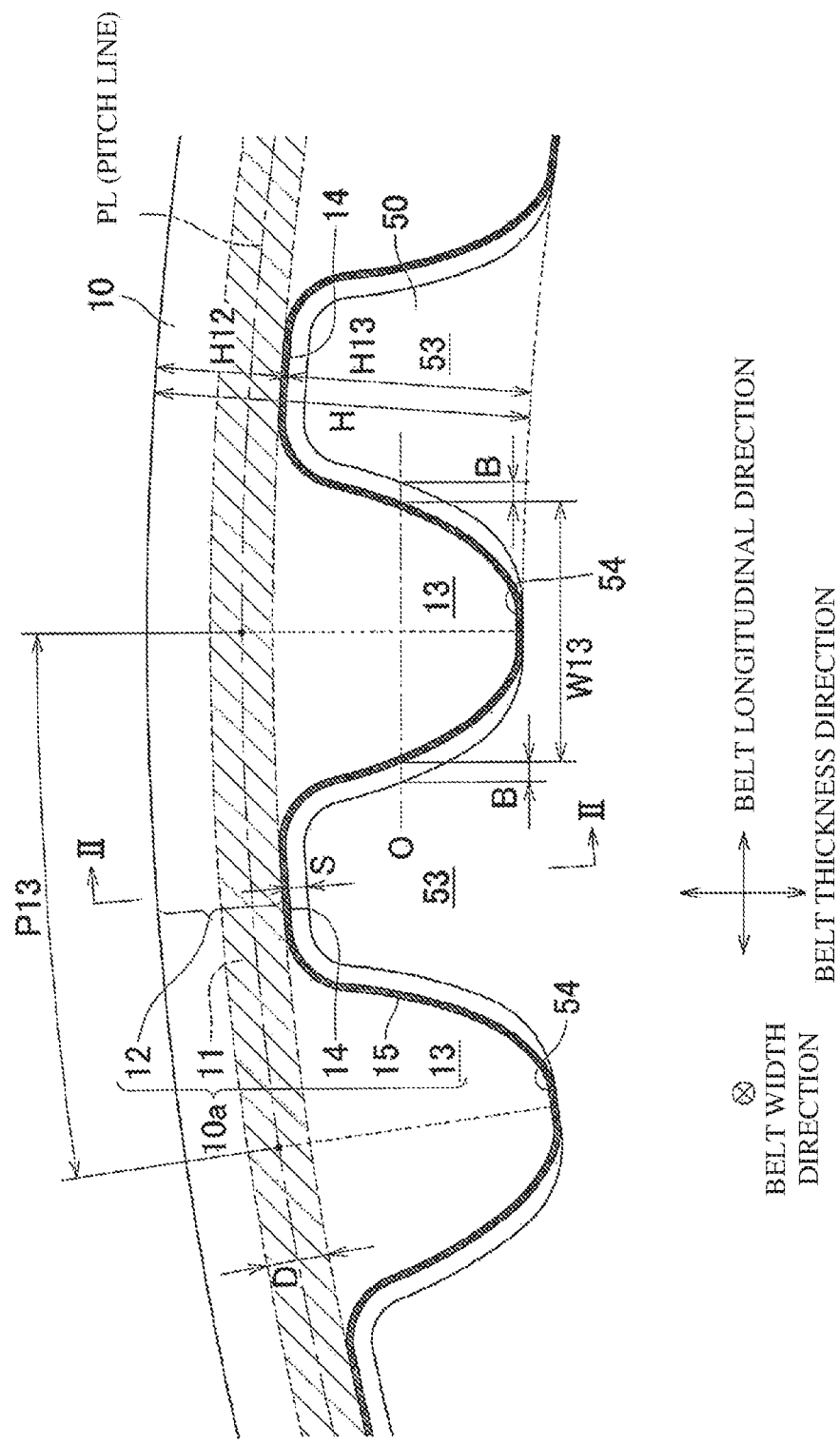
[FIG.1]

[FIG. 2]
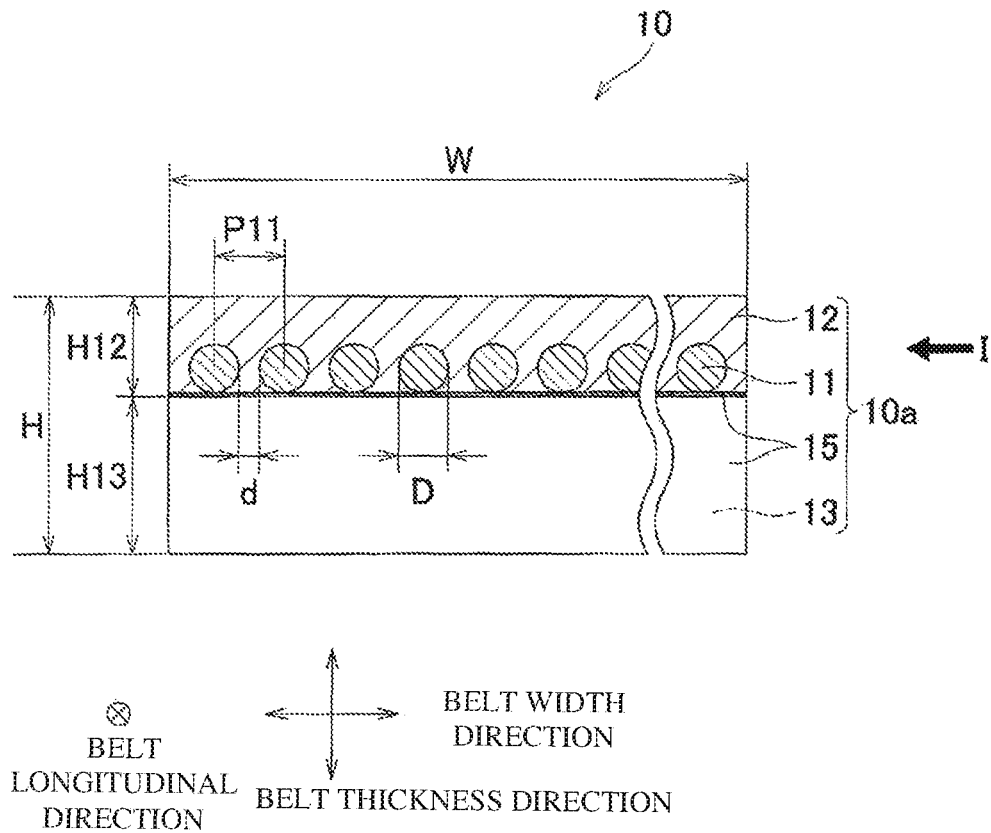
[FIG. 3]
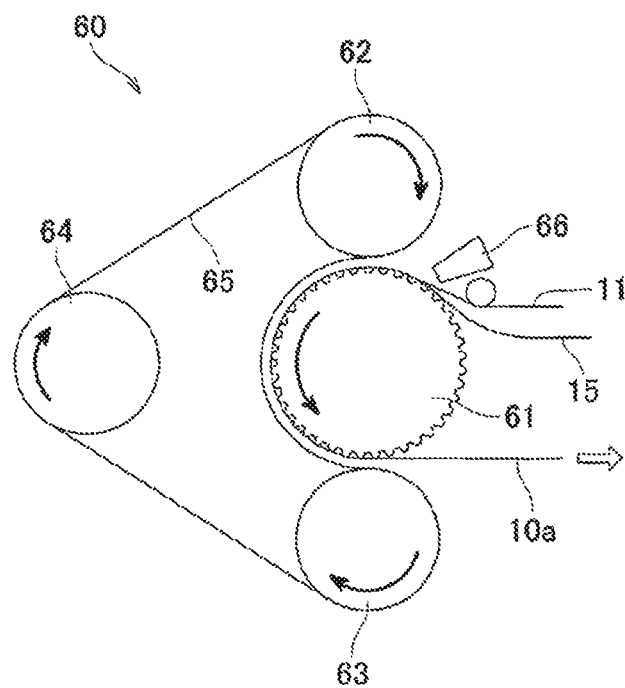

[FIG. 4]
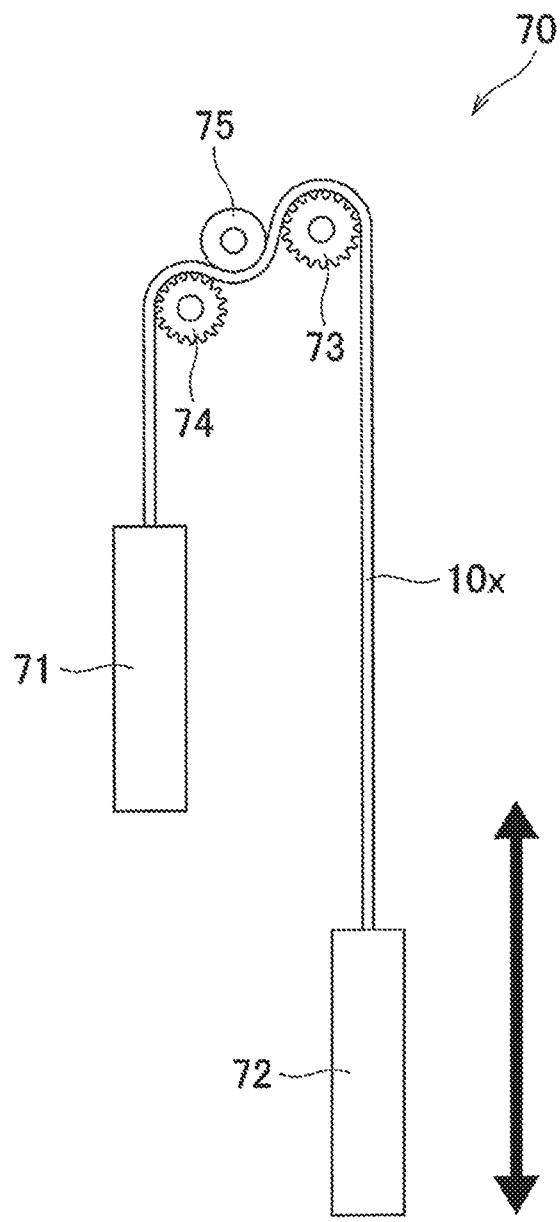

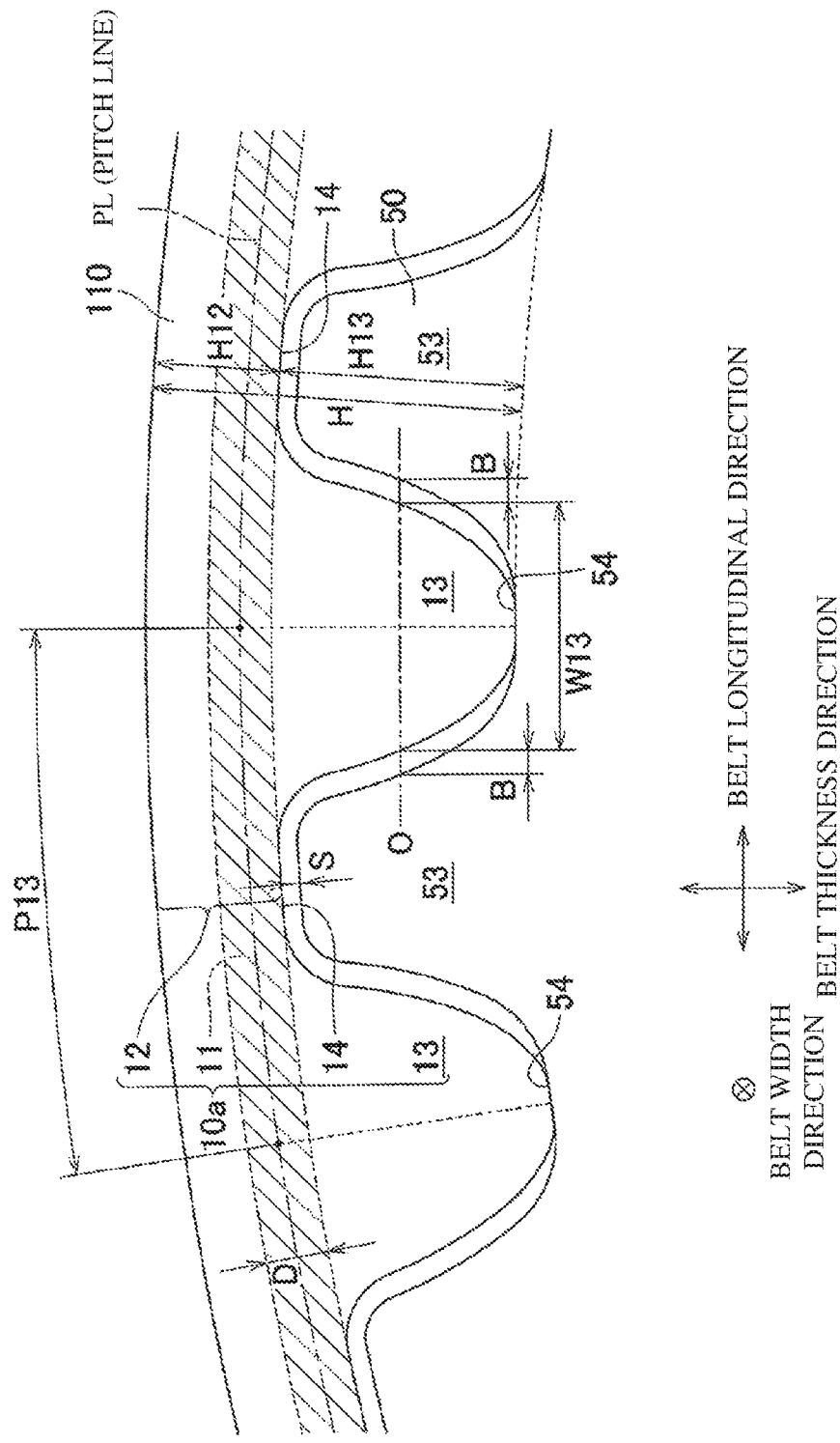

TOOTHED BELT TRANSMISSION DEVICE

CROSS REFERENCE TO RELATED APPLICATIONS

This is a U.S. National Phase Application under 35 U.S.C. § 371 of International Application No. PCT/JP2018/020622, filed May 29, 2018, which claims priority to Japanese Application Nos. 2017-106153, filed May 30, 2017 and 2018-096312, filed May 18, 2018, which was published Under PCT Article 21(2), the entire contents of which are incorporated herein by reference.

TECHNICAL FIELD

The present invention relates to a toothed belt power-transmission device that includes a toothed belt on which belt teeth and belt tooth bottom portions are formed alternately and a toothed pulley on which pulley teeth and pulley tooth bottom portions are formed alternately to mesh with the toothed belt.

BACKGROUND ART

A toothed belt power-transmission device has been widely used as an elevation-conveying device in the fields of general industry or agriculture, and may also be used as a device for adjusting an angle of a blade in a wind power generator. In the situations where the toothed belt power-transmission device is used in various environment, an improvement in wear resistance is required for a toothed belt of the toothed belt power-transmission device. For example, Patent Literatures 1 and 2 disclose techniques for improving the wear resistance of a toothed belt.

CITATION LIST

Patent Literature

Patent Literature 1: JP-A-2012-215248
Patent Literature 2: JP-A-H07-158700

SUMMARY OF INVENTION

Technical Problem

However, there is a limit on the improvement of the wear resistance by only devising the material constitution of the toothed belt as in Patent Literatures 1 and 2.

Particularly, when used as a wind power generator, there occurs a phenomenon that the toothed belt and the toothed pulley swing in small motions while being meshed with each other due to an influence of wind. In this case, belt tooth bottom portions of the toothed belt may wear due to friction with pulley teeth, which can lead to a reduction in strength of the toothed belt and consequent breakages of the toothed belt.

An object of the present invention is to provide a toothed belt power-transmission device capable of preventing wear of belt tooth bottom portions of a toothed belt.

Solution to Problem

The present invention provides a toothed belt power-transmission device that includes: a toothed belt having belt teeth and belt tooth bottom portions formed alternately; and a toothed pulley having pulley teeth and pulley tooth bottom portions formed alternately to be configured to mesh with the toothed belt, in which tip ends of the belt teeth are in contact with the pulley tooth bottom portions, tip ends of the pulley teeth are not in contact with the belt tooth bottom portions to provide a gap between the tip ends of the pulley teeth and the belt tooth bottom portions.

According to the present invention, transmission of power is realized by bringing the tip ends of the belt teeth and the pulley tooth bottom portions in contact with each other. Meanwhile, the tip ends of the pulley teeth are not in contact with the belt tooth bottom portions and the gap is provided therebetween, so that the belt tooth bottom portions do not wear due to friction with the pulley teeth and wear of the belt tooth bottom portions can be prevented even in the case where the above-mentioned swing in small motions occurs.

The gap may be 5 to 11% of a height of the belt teeth. In the case where the gap is less than 5% of the height of the belt teeth, there may arise a problem that the wear of the belt tooth bottom portions cannot be prevented. In the case where the gap exceeds 11% of the height of the belt teeth, there may arise a problem that durability of the belt teeth may be hindered although the wear of the belt tooth bottom portions can be prevented. In contrast, these problems can be prevented according to the above configuration.

At a central position of the belt teeth in a height direction of the belt teeth, a backlash that is 2.5 to 3.5% of a width of the belt teeth at the central position, may be provided between the belt teeth and the pulley teeth. According to this configuration, the interference between the belt teeth and the pulley teeth can be prevented, the wear of the belt teeth can be prevented, and the positioning accuracy of the belt teeth and the pulley teeth can be ensured.

The belt teeth may have a pitch of 14 mm or more, and the belt teeth may have a height of 5 mm or more. According to this configuration, the withstand load of the toothed belt can be increased.

The toothed belt may include a back surface portion opposite to the belt teeth in a height direction of the belt teeth, and a plurality of tension members embedded in the back surface portion. Each of the plurality of tension members may include a steel cord or a cord obtained by twisting at least one of an aramid fiber and a carbon fiber.

Each of the plurality of tension members may include a steel cord and may have a strength of 7 to 8 kN and a diameter of 2.3 to 2.6 mm. According to this configuration, the belt strength per 1 mm of the belt width of the toothed belt can be improved by using the steel cord having a feature of low elongation and high strength as the tension member.

The plurality of tension members may have a pitch of 3.0 to 3.7 mm, and the plurality of tension members may have an interval therebetween of 0.4 to 1.4 mm. According to this configuration, the belt strength per 1 mm of the belt width of the toothed belt can be improved more reliably by a suitable combination of the pitch of the tension members and the interval between the tension members.

The back surface portion and the belt teeth may be integrally formed of a thermoplastic elastomer, and the thermoplastic elastomer may include at least one selected from the group consisting of polyurethane thermoplastic elastomers, polyester thermoplastic elastomers, polystyrene thermoplastic elastomers, polyolefin thermoplastic elastomers, polyamide thermoplastic elastomers, and vinyl chloride thermoplastic elastomers.

The back surface portion and the belt teeth may be integrally formed of a thermoplastic elastomer that is a polyurethane thermoplastic elastomer and has a hardness of 38 to 53°. According to this configuration, the toothed belt having excellent mechanical properties and durability can be obtained. Furthermore, the toothed belt becomes easy to manufacture since the polyurethane thermoplastic elastomer is generally used for a power-transmission belt and a transport belt. The kind of polyurethane forming the polyurethane thermoplastic elastomer may be preferably a polyether polyurethane, a polyester polyurethane, or a polycarbonate polyurethane.

The toothed belt may have a belt strength per 1 mm of a belt width of 1.85 kN or more. According to this configuration, the withstand load of the toothed belt can be increased.

A reinforcing cloth may be disposed on surfaces of the belt teeth and surfaces of the belt tooth bottom portions. According to this configuration, wear of the belt teeth can be prevented.

Advantageous Effects of Invention

According to the present invention, transmission of power is realized by bringing the tip ends of the belt teeth and the pulley tooth bottom portions in contact with each other. Meanwhile, the tip ends of the pulley teeth are not in contact with the belt tooth bottom portions and the gap is provided therebetween, so that the belt tooth bottom portions do not wear due to friction with the pulley teeth and wear of the belt tooth bottom portions can be prevented even in the case where the above-mentioned swing in small motions occurs.

BRIEF DESCRIPTION OF DRAWINGS

FIG. 1 is a side view taken along a belt longitudinal direction (seen from the direction of an arrow I in FIG. 2), illustrating a part (with a reinforcing cloth) of a toothed belt power-transmission device according to an embodiment of the present invention.

FIG. 2 is a cross-sectional view taken along a belt width direction (along a line II-II in FIG. 1), illustrating a toothed belt contained in the toothed belt power-transmission device according to the embodiment of the present invention.

FIG. 3 is a schematic view for explaining a method for manufacturing a toothed belt contained in the toothed belt power-transmission device according to the embodiment of the present invention.

FIG. 4 is a schematic view illustrating a running tester used in a running test.

FIG. 5 is a side view along the belt longitudinal direction, illustrating a part (without a reinforcing fabric) of a toothed belt power-transmission device according to an embodiment of the present invention.

DESCRIPTION OF EMBODIMENTS

A toothed belt power-transmission device 1 according to an embodiment of the present invention includes a toothed belt 10 and a toothed pulley 50, as is illustrated in FIG. 1.

The toothed belt 10 includes a belt main body 10a that includes a plurality of tension members 11, a back surface portion 12 in which the plurality of tension members 11 are embedded, a plurality of belt teeth 13, a plurality of belt tooth bottom portions 14, and a reinforcing fabric 15 provided on an inner peripheral surface (surfaces of the plurality of belt teeth 13 and surfaces of the plurality of belt tooth bottom portions 14) of the toothed belt 10, as is illustrated in FIG. 1 and FIG. 2.

In the present embodiment, each tension member 11 is formed of a steel cord (cord obtained by twisting steel fibers). The plurality of tension members 11 extend in a belt longitudinal direction and are arranged in a belt width direction. In FIG. 1, a central position of the tension members 11 in a belt thickness direction is described as a pitch line PL. The pitch line PL is a reference line of the toothed belt 10 in the belt longitudinal direction, at which the toothed belt 10 keeps the same length without extending or contracting in the belt longitudinal direction even when bent along an outer periphery of the toothed pulley 50.

The plurality of belt teeth 13 are opposite to the back surface portion 12 in the belt thickness direction (height direction of the belt teeth 13) and are spaced apart from each other in the belt longitudinal direction. In the present embodiment, the back surface portion 12 and the plurality of belt teeth 13 are integrally formed of a thermoplastic elastomer. The thermoplastic elastomer forming the back surface portion 12 and the plurality of belt teeth 13 in the present embodiment is a polyurethane thermoplastic elastomer having a hardness of 38 to 53° (measured by a D type hardness meter in accordance with JIS K6253: 2012). The kind of polyurethane constituting the polyurethane thermoplastic elastomer is a polyether polyurethane, a polyester polyurethane, or a polycarbonate polyurethane.

The reinforcing fabric 15 is formed of a woven fabric obtained by weaving warps and wefts to cross vertically and horizontally according to a certain rule. The manner of weaving of the woven fabric may be any of twill weave, satin weave, and the like. The form of the warps and the wefts may be any of multifilament yarns obtained by aligning or twisting filaments (long fibers), monofilament yarns that are each a long fiber, and spun yarns obtained by twisting short fibers. In the case where the warps or the wefts are multifilament yarns or spun yarns, mixed-twisted yarns or mixed-spun yarns using a plurality of types of fibers may be used. As the material of fibers constituting the reinforcing fabric 15, use can be made of any one of nylon, aramid, polyester, polybenzoxazole, cotton, fluorine, and the like, or a combination thereof. The reinforcing fabric 15 may be further provided on an outer peripheral surface of the toothed belt 10 or be provided on the outer peripheral surface of the toothed belt 10 only. A configuration where the reinforcing fabric 15 is provided on neither the inner peripheral surface nor the outer peripheral surface of the toothed belt 10 may also be employed.

The belt teeth 13 and the belt tooth bottom portions 14 are formed alternately in the belt longitudinal direction. The belt tooth bottom portions 14 are each a bottom of a concave portion formed between two belt teeth 13 adjacent in the belt longitudinal direction. In the present embodiment, the belt tooth bottom portions 14 are formed of the back surface portion 12 including the reinforcing fabric 15.

The toothed belt 10 in the present embodiment satisfies the following requirements.

Belt width W=20 to 200 mm
Total belt thickness H=9 to 15 mm
Total value H12 of the thickness of the back surface portion 12 and the thickness of the reinforcing fabric 15=4 mm or more
Height H13 of each belt tooth 13 (including the thickness of the reinforcing fabric 15)=5 to 12 mm
Pitch P13 of the belt teeth 13 (distance on the pitch line PL)=14 to 25 mm
Diameter D of each tension member 11=2.3 to 2.6 mm
Strength of each tension member 11=7 to 8 kN
Pitch P11 of the tension members 11=3.0 to 3.7 mm Interval d between the tension members 11=0.4 to 1.4 mm (a total value of intervals d is 13 to 36% of the belt width W)

Belt strength per 1 mm of belt width=1.85 kN or more and 2.60 kN or less.

The toothed pulley 50 meshes with the toothed belt 10 and includes a plurality of pulley teeth 53 and a plurality of pulley tooth bottom portions 54, as is illustrated in FIG. 1.

The pulley teeth 53 and the pulley tooth bottom portions 54 are alternately formed in the belt longitudinal direction. The pulley tooth bottom portions 54 are each a bottom of a concave portion formed between two pulley teeth 53 adjacent in the belt longitudinal direction.

The belt teeth 13 are each disposed in a concave portion formed between two pulley teeth 53 adjacent in the belt longitudinal direction. The pulley teeth 53 are each disposed in a concave formed between two belt teeth 13 adjacent in the belt longitudinal direction.

Herein, tip ends of the belt teeth 13 are in contact with the pulley tooth bottom portions 54. However, tip ends of the pulley teeth 53 are not in contact with the belt tooth bottom portions 14, and a gap S is provided between the tip ends of the pulley teeth 53 and the belt tooth bottom portions 14. In the present embodiment, the gap S is 5 to 11% of the height H13 of the belt teeth 13.

Furthermore, in the present embodiment, at a central position O of the belt teeth 13 in the belt thickness direction (height direction of the belt teeth), a backlash (a gap intentionally provided in a motion direction of machine elements that move in a meshed manner, such as a feed screw and a gear used in a machine) B is provided between the belt teeth 13 and the pulley teeth 53. The backlash B is 2.5 to 3.5% of the width W13 of the belt teeth 13 at the central position O. In the present embodiment, the backlash B is provided both between one belt tooth 13 and one pulley tooth 53 adjacent thereto on one side in the belt longitudinal direction, and between the one belt tooth 13 and another pulley tooth 53 adjacent thereto on the other side in the belt longitudinal direction.

The toothed belt power-transmission device 1 can be used under an environment where the tension applied to the toothed belt 10 is always 0.35 kN/mm or more and a maximum tension of 0.80 to 0.95 kN/mm will be applied. For example, it can be used as a device for adjusting an angle of a blade in a wind power generator and an elevation-conveying device.

Next, an example of a manufacturing method of the toothed belt 10 will be described.

The toothed belt 10 is manufactured, for example, by a manufacturing apparatus 60 as illustrated in FIG. 3. The manufacturing apparatus 60 includes a molding drum 61, pulleys 62 and 63 closely disposed above and below the molding drum 61, a pulley 64 disposed facing the molding drum 61 in a horizontal direction, a pressing band 65 that is an endless metal band wound around the pulleys 62 to 64, an extrusion head 66 from which a thermoplastic elastomer is extruded, a tension member-supplying device (not illustrated), and a reinforcing fabric-supplying device (not illustrated).

Grooves for forming the belt teeth 13 are formed on an outer peripheral surface of the molding drum 61 at predetermined intervals in the circumferential direction. The pulley 64 is movable in the horizontal direction relative to the molding drum 61 and applies a predetermined tension to the pressing band 65. The pressing band 65 is arranged so as to be wound on the outer peripheral surface of the molding drum 61 for about a half circumference and is pressed against the outer peripheral surface of the molding drum 61 by the tension applied from the pulley 64.

The reinforcing fabric-supplying device (not illustrated) supplies the reinforcing fabric 15 to the outer peripheral surface of the molding drum 61. The tension member-supplying device (not illustrated) supplies the plurality of tension members 11 arranged in an axial direction of the molding drum 61 to an outer peripheral surface side of the reinforcing fabric 15 that is supplied to the outer peripheral surface of the molding drum 61. The extrusion head 66 supplies the thermoplastic elastomer in a state of being melted by heating to an outer peripheral surface side of the reinforcing fabric 15 and the tension members 11 that are supplied to the outer peripheral surface of the molding drum 61.

The melted thermoplastic elastomer, the plurality of tension members 11, and the reinforcing fabric 15 that are supplied to the outer peripheral surface of the molding drum 61 are wound between the molding drum 61 and the pressing band 65 accompanying the rotation of the molding drum 61. At this time, the thermoplastic elastomer is filled in the grooves formed on the outer peripheral surface of the molding drum 61 by the pressing force from the pressing band 65 so that the belt teeth 13 are formed in the grooves. At this time, the supplied reinforcing fabric 15 is also filled in the grooves formed on the outer peripheral surface of the molding drum 61 and is disposed along a surface of the thermoplastic elastomer serving as the belt teeth 13. The back surface portion 12 in which the plurality of tension members 11 are embedded is formed between the reinforcing fabric 15 disposed on the outer peripheral surface of the molding drum 61 and the pressing band 65. The thermoplastic elastomer is then strongly pressed against the outer peripheral surface of the molding drum 61 by the pressing force from the pressing band 65, and the thermoplastic elastomer is cooled and solidified. The belt main body 10a is continuously taken out from a position where the pressing band 65 is separated from the molding drum 61.

As described above, according to the present embodiment, transmission of power is realized by bringing the tip ends of the belt teeth 13 and the pulley tooth bottom portions 54 in contact with each other, as is illustrated in FIG. 1. Meanwhile, the tip ends of the pulley teeth 53 are not in contact with the belt tooth bottom portions 14 and the gap S is provided therebetween, so that the belt tooth bottom portions 14 do not wear due to friction with the pulley teeth 53 and wear of the belt tooth bottom portions 14 can be prevented even in the case where the above-mentioned swing in small motions occurs.

In the present embodiment, the gap S is 5 to 11% of the height H13 of the belt teeth 13. In the case where the gap S is less than 5% of the height H13 of the belt teeth 13, there may arise a problem that the wear of the belt tooth bottom portions 14 cannot be prevented. In the case where the gap S exceeds 11% of the height H13 of the belt teeth 13, there may arise a problem that durability of the belt teeth 13 may be hindered although the wear of the belt tooth bottom portions 14 can be prevented. In contrast, these problems can be prevented according to the above configuration.

In the present embodiment, the backlash B that is 2.5 to 3.5% of the width W13 of the belt teeth 13 at the central position O, is provided between the belt teeth 13 and the pulley teeth 53 at the central position O of the belt teeth 13 in the belt thickness direction. According to this configuration, the interference between the belt teeth 13 and the pulley teeth 53 can be prevented, the wear of the belt teeth 13 can be prevented, and the positioning accuracy of the belt teeth 13 and the pulley teeth 53 can be ensured.

In the present embodiment, the pitch P13 of the belt teeth 13 is 14 mm or more and the height H13 of the belt teeth 13 is 5 mm or more. According to this configuration, the withstand load of the toothed belt 10 can be increased.

In the present embodiment, each tension member 11 of the toothed belt 10 is formed of a steel cord having a strength of 7 to 8 kN and a diameter D of 2.3 to 2.6 mm According to this configuration, the belt strength per 1 mm of the belt width of the toothed belt 10 can be improved by using the steel cord having a feature of low elongation and high strength as the tension member 11.

In the present embodiment, the pitch P11 of the tension members 11 is 3.0 to 3.7 mm and the interval d between the tension members 11 is 0.4 to 1.4 mm. According to this configuration, the belt strength per 1 mm of the belt width of the toothed belt 10 can be improved more reliably by a suitable combination of the pitch P11 of the tension members 11 and the interval d between the tension members 11.

In the present embodiment, the back surface portion 12 and the belt teeth 13 are integrally formed of a thermoplastic elastomer that is a polyurethane thermoplastic elastomer having a hardness of 38 to 53°. According to this configuration, the toothed belt 10 having excellent mechanical properties and durability can be obtained. Furthermore, the toothed belt 10 is easy to manufacture since the polyurethane thermoplastic elastomer is generally used for a power-transmission belt and a transport belt.

In the present embodiment, the belt strength per 1 mm of the belt width of the toothed belt 10 is 1.85 kN or more. According to this configuration, the withstand load of the toothed belt 10 can be increased.

In the present embodiment, the reinforcing fabric 15 is disposed on the surfaces of the belt teeth 13 and surfaces of the belt tooth bottom portions 14. According to this configuration, wear of the belt teeth 13 can be prevented.

The above-mentioned embodiment describes the toothed belt 10 including the reinforcing fabric 15 provided on the inner peripheral surface (the surfaces of the plurality of belt teeth 13 and surfaces of the plurality of belt tooth bottom portions 14) of the toothed belt 10. However, in the present invention, the toothed belt 10 may have a configuration where the reinforcing fabric 15 is not provided on the inner peripheral surface. Accordingly, FIG. 5 illustrates a toothed belt 110 having no reinforcing fabric 15 provided.

The toothed belt 110 includes the belt main body 10a that includes the plurality of tension members 11, the back surface portion 12 in which the plurality of tension members 11 are embedded, the plurality of belt teeth 13, and the plurality of belt tooth bottom portions 14. The toothed belt 110 is the same as the toothed belt 10 illustrated in FIG. 1 except that the reinforcing fabric 15 is not provided. Accordingly, reference numerals of the structure of the toothed belt 110 shown in FIG. 5 are common to the reference numerals of the structure of the toothed belt 10 shown in FIG. 1 and descriptions thereof will be omitted. However, the toothed belt 110 needs to satisfy requirements of the contents described in the embodiment of the toothed belt 10, for example, "the thickness H12 of the back surface portion 12=4 mm or more", except for the configuration of the reinforcing fabric 15.

EXAMPLES

The inventor of the present application manufactured toothed belts according to Examples 1 to 22 and Comparative Examples 1 to 2 by using a polyurethane-based or a polyester-based thermoplastic elastomer with the above-described manufacturing method, and performed a running test and a tensile test on these toothed belts. Constitutions and test results of the toothed belts according to Examples 1 to 22 and Comparative Examples 1 to 2 are shown in Tables 1 to 7 below.

Herein, Table 1 describes the constitutions of the toothed belts according to Examples 1 to 6 and Comparative Example 1 in order to compare the cases where values (distances) of the gap S between tip ends of pulley teeth and belt tooth bottom portions were varied. Table 2 describes the constitutions of the toothed belts according to Examples 3 and 7 to 11 in order to compare the cases where values (distances) of the backlash B between the belt teeth 13 and the pulley teeth 53 were varied. Table 3 describes the constitutions of the toothed belts according to Examples 3, 12 and 13 in order to compare the cases where the teeth scale (tooth pitch P13, tooth height H13) of the toothed belts were varied. Table 4 describes the constitutions of the toothed belts according to Examples 3 and 14 to 16 in order to compare the cases where the hardness of a back surface portion and belt teeth, which were integrally formed of a polyurethane (polyester type) thermoplastic elastomer were varied. Table 5 describes the constitutions of the toothed belts according to Examples 3, 17 and 18 in order to compare the cases where the pitch P11 of tension members were varied. Table 6 describes the constitutions of the toothed belt (Example 3) in which a back surface portion and belt teeth were integrally formed of a polyurethane thermoplastic elastomer, and of the toothed belt (Example 19) in which a back surface portion and belt teeth were integrally formed of a polyester thermoplastic elastomer. Table 7 describes the constitutions of the toothed belts according to Examples 1, 3 and 6, Comparative Example 1, Examples 20 to 22, and Comparative Example 2 in order to compare the cases where a reinforcing fabric was provided on an inner peripheral surface (surfaces of belt teeth and surfaces of belt tooth bottom portions) of a toothed belt and the cases where no reinforcing fabric was provided.

TABLE 1

| | | Ex. 1 | Ex. 2 | Ex. 3 | Ex. 4 | Ex. 5 | Ex. 6 | Comp. Ex. 1 |
|---|---|---|---|---|---|---|---|---|
| Tension members | The number of tension members | | | | 6 | | | |
| | Diameter (D) of each tension member | | | | 2.5 mm (raw cords = 84) | | | |
| | Strength of each tension member | | | | 7.2 kN | | | |
| | Pitch (P11) of tension members | | | | 3.2 mm | | | |
| | Interval (d) between tension members | | | | 0.7 mm | | | |

TABLE 1-continued

| | | Ex. 1 | Ex. 2 | Ex. 3 | Ex. 4 | Ex. 5 | Ex. 6 | Comp. Ex. 1 |
|---|---|---|---|---|---|---|---|---|
| Thermo-plastic elastomer | Type | Polyester type polyurethane | | | | | | |
| | Hardness (D type) | colspan: 50 | | | | | | |
| Reinforcing fabric (inner peripheral surface) | | colspan: 66 nylon woven fabric having a thickness of 0.5 mm | | | | | | |
| Type Size | Belt width (W) | colspan: 20 mm | | | | | | |
| | Type of teeth | G14M | | | | | | |
| | Height (H13) of belt teeth | colspan: 6.1 mm | | | | | | |
| | Pitch (P13) of belt teeth | colspan: 14 mm | | | | | | |
| | Belt width (W13) at central position (O) | colspan: 7.5 mm | | | | | | |
| Relation to pulley | Backlash (B) | colspan: 0.23 mm | | | | | | |
| | Proportion of backlash (B) to belt width (W13) at central position (O) | colspan: 3.00% | | | | | | |
| | Gap (S) | 0.25 mm | 0.35 mm | 0.5 mm | 0.61 mm | 0.65 mm | 0.8 mm | 0 mm |
| | Proportion of gap (S) to height (H13) of belt teeth | 4.1% | 5.6% | 8.2% | 10.0% | 10.7% | 13.1% | 0% |
| Running performance | Belt strength Before running | 2.19 kN/mm | 2.18 kN/mm | 2.18 kN/mm | 2.18 kN/mm | 2.20 kN/mm | 2.17 kN/mm | 2.18 kN/mm |
| | After running | 2.16 kN/mm | 2.15 kN/mm | 2.15 kN/mm | 2.16 kN/mm | 2.17 kN/mm | 2.15 kN/mm | 1.11 kN/mm |
| | Reduction rate | 1% | 1% | 1% | 1% | 1% | 1% | 49% |
| | State of teeth | Excellent | Excellent | Excellent | Excellent | Excellent | Good | Good |
| | State of tooth bottom portion | Good | Excellent | Excellent | Excellent | Excellent | Excellent | Poor |
| | Judgement | B | A | A | A | A | B | C |

TABLE 2

| | | Ex. 7 | Ex. 8 | Ex. 9 | Ex. 3 | Ex. 10 | Ex. 11 |
|---|---|---|---|---|---|---|---|
| Tension members | The number of tension members | colspan: 6 | | | | | |
| | Diameter (D) of each tension member | colspan: 2.5 mm (raw cords = 84) | | | | | |
| | Strength of each tension member | colspan: 7.2 kN | | | | | |
| | Pitch (P11) of tension members | colspan: 3.2 mm | | | | | |
| | Interval (d) between tension members | colspan: 0.7 mm | | | | | |
| Thermoplastic elastomer | Type | Polyester type polyurethane | | | | | |
| | Hardness (D type) | colspan: 50 | | | | | |
| Reinforcing fabric (inner peripheral surface) | | colspan: 66 nylon woven fabric having a thickness of 0.5 mm | | | | | |
| Type Size | Belt width (W) | colspan: 20 mm | | | | | |
| | Type of teeth | G14M | | | | | |
| | Height (H13) of belt teeth | colspan: 6.1 mm | | | | | |
| | Pitch (P13) of belt teeth | colspan: 14 mm | | | | | |
| | Belt width (W13) at central position (O) | colspan: 7.5 mm | | | | | |
| Relation to pulley | Backlash (B) | 0.11 mm | 0.15 mm | 0.19 mm | 0.23 mm | 0.26 mm | 0.3 mm |
| | Proportion of backlash (B) to belt width (W13) at central position (O) | 1.5% | 2.0% | 2.5% | 3.0% | 3.5% | 4.0% |
| | Gap (S) | colspan: 0.5 mm | | | | | |
| | Proportion of gap (S) to height (H13) of belt teeth | colspan: 8.2% | | | | | |

TABLE 2-continued

|  |  |  | Ex. 7 | Ex. 8 | Ex. 9 | Ex. 3 | Ex. 10 | Ex. 11 |
|---|---|---|---|---|---|---|---|---|
| Running performance | Belt strength | Before running | 2.19 kN/mm | 2.20 kN/mm | 2.17 kN/mm | 2.18 kN/mm | 2.18 kN/mm | 2.19 kN/mm |
|  |  | After running | 2.17 kN/mm | 2.17 kN/mm | 2.14 kN/mm | 2.15 kN/mm | 2.15 kN/mm | 2.16 kN/mm |
|  |  | Reduction rate | 1% | 1% | 1% | 1% | 1% | 1% |
|  | State of teeth |  | Good | Good | Excellent | Excellent | Excellent | Good |
|  | State of tooth bottom portion |  | Excellent | Excellent | Excellent | Excellent | Excellent | Excellent |
|  | Judgement |  | B | A | A | A | A | B |

TABLE 3

|  |  | Ex. 3 | Ex. 12 | Ex. 13 |
|---|---|---|---|---|
| Tension members | The number of tension members | 6 | | |
|  | Diameter (D) of each tension member | 2.5 mm (raw cords = 84) | | |
|  | Strength of each tension member | 7.2 kN | | |
|  | Pitch (P11) of tension members | 3.2 mm | | |
|  | Interval (d) between tension members | 0.7 mm | | |
| Thermoplastic elastomer | Type | Polyester type polyurethane | | |
|  | Hardness (D type) | 50 | | |
| Reinforcing fabric (inner peripheral surface) |  | 66 nylon woven fabric having a thickness of 0.5 mm | | |
| Type Size | Belt width (W) | 20 mm | | |
|  | Type of teeth | G14M | G20M | G25M |
|  | Height (H13) of belt teeth | 6.1 mm | 8.7 mm | 10.8 mm |
|  | Pitch (P13) of belt teeth | 14 mm | 20 mm | 25 mm |
|  | Belt width (W13) at central position (O) | 7.5 mm | 10.7 mm | 13.4 mm |
| Relation to pulley | Backlash (B) | 0.23 mm | 0.32 mm | 0.40 mm |
|  | Proportion of backlash (B) to belt width (W13) at central position (O) |  | 3.0% |  |
|  | Gap (S) |  | 0.5 mm |  |
|  | Proportion of gap (S) to height (H13) of belt teeth |  | 8.2% |  |
| Running performance | Belt strength Before running | 2.18 kN/mm | 2.16 kN/mm | 2.19 kN/mm |
|  | After running | 2.15 kN/mm | 2.13 kN/mm | 2.16 kN/mm |
|  | Reduction rate | 1% | 1% | 1% |
|  | State of teeth | Excellent | Excellent | Excellent |
|  | State of tooth bottom portion | Excellent | Excellent | Excellent |
|  | Judgement | A | A | A |

TABLE 4

|  |  | Ex. 14 | Ex. 15 | Ex. 3 | Ex. 16 |
|---|---|---|---|---|---|
| Tension members | The number of tension members | 6 | | | |
|  | Diameter (D) of each tension member | 2.5 mm (raw cords = 84) | | | |
|  | Strength of each tension member | 7.2 kN | | | |
|  | Pitch (P11) of tension members | 3.2 mm | | | |
|  | Interval (d) between tension members | 0.7 mm | | | |
| Thermoplastic elastomer | Type | Polyester type polyurethane | | | |
|  | Hardness (D type) | 30 | 38 | 50 | 53 |
| Reinforcing fabric (inner peripheral surface) |  | 66 nylon woven fabric having a thickness of 0.5 mm | | | |
| Type Size | Belt width (W) | 20 mm | | | |
|  | Type of teeth | G14M | | | |
|  | Height (H13) of belt teeth | 6.1 mm | | | |
|  | Pitch (P13) of belt teeth | 14 mm | | | |
|  | Belt width (W13) at central position (O) | 7.5 mm | | | |

TABLE 4-continued

|  |  | Ex. 14 | Ex. 15 | Ex. 3 | Ex. 16 |
|---|---|---|---|---|---|
| Relation to pulley | Backlash (B) | | | 0.23 mm | |
|  | Proportion of backlash (B) to belt width (W13) at central position (O) | | | 3.0% | |
|  | Gap (S) | | | 0.5 mm | |
|  | Proportion of gap (S) to height (H13) of belt teeth | | | 8.2% | |
| Running performance | Belt strength Before running | 2.15 kN/mm | 2.17 kN/mm | 2.18 kN/mm | 2.20 kN/mm |
|  | After running | 2.12 kN/mm | 2.14 kN/mm | 2.15 kN/mm | 2.17 kN/mm |
|  | Reduction rate | 1% | 1% | 1% | 1% |
|  | State of teeth | Good | Excellent | Excellent | Excellent |
|  | State of tooth bottom portion | Good | Excellent | Excellent | Excellent |
|  | Judgement | B | A | A | A |

TABLE 5

|  |  | Ex. 3 | Ex. 17 | Ex. 18 |
|---|---|---|---|---|
| Tension members | The number of tension members | 6 | 5 | 5 |
|  | Diameter (D) of each tension member | | 2.5 mm (raw cords = 84) | |
|  | Strength of each tension member | | 7.2 kN | |
|  | Pitch (P11) of tension members | 3.2 mm | 3.5 mm | 3.7 mm |
|  | Interval (d) between tension members | 0.7 mm | 1.0 mm | 1.2 mm |
| Thermoplastic elastomer | Type | | Polyester type polyurethane | |
|  | Hardness (D type) | | 50 | |
| Reinforcing fabric (inner peripheral surface) | | | 66 nylon woven fabric having a thickness of 0.5 mm | |
| Type Size | Belt width (W) | | 20 mm | |
|  | Type of teeth | | G14M | |
|  | Height (H13) of belt teeth | | 6.1 mm | |
|  | Pitch (P13) of belt teeth | | 14 mm | |
|  | Belt width (W13) at central position (O) | | 7.5 mm | |
| Relation to pulley | Backlash (B) | | 0.23 mm | |
|  | Proportion of backlash (B) to belt width (W13) at central position (O) | | 3.0% | |
|  | Gap (S) | | 0.5 mm | |
|  | Proportion of gap (S) to height (H13) of belt teeth | | 8.2% | |
| Running performance | Belt strength Before running | 2.18 kN/mm | 1.97 kN/mm | 1.95 kN/mm |
|  | After running | 2.15 kN/mm | 1.87 kN/mm | 1.86 kN/mm |
|  | Reduction rate | 1% | 5% | 5% |
|  | State of teeth | Excellent | Excellent | Excellent |
|  | State of tooth bottom portion | Excellent | Excellent | Excellent |
|  | Judgement | A | B | B |

TABLE 6

|  |  | Ex. 3 | Ex. 19 |
|---|---|---|---|
| Tension members | The number of tension members | | 6 |
|  | Diameter (D) of each tension member | | 2.5 mm (raw cords = 84) |
|  | Strength of each tension member | | 7.2 kN |
|  | Pitch (P11) of tension members | | 3.2 mm |
|  | Interval (d) between tension members | | 0.7 mm |
| Thermoplastic elastomer | Type | Polyester type polyurethane | Polyester |
|  | Hardness (D type) | | 50 |
| Reinforcing fabric (inner peripheral surface) | | | 66 nylon woven fabric having a thickness of 0.5 mm |
| Type Size | Belt width (W) | | 20 mm |
|  | Type of teeth | | G14M |
|  | Height (H13) of belt teeth | | 6.1 mm |
|  | Pitch (P13) of belt teeth | | 14 mm |
|  | Belt width (W13) at central position (O) | | 7.5 mm |

TABLE 6-continued

|  |  | Ex. 3 | Ex. 19 |
|---|---|---|---|
| Relation to pulley | Backlash (B) | 0.23 mm | |
|  | Proportion of backlash (B) to belt width (W13) at central position (O) | 3.0% | |
|  | Gap (S) | 0.5 mm | |
|  | Proportion of gap (S) to height (H13) of belt teeth | 8.2% | |
| Running performance | Belt strength  Before running | 2.18 kN/mm | 2.15 kN/mm |
|  | After running | 2.15 kN/mm | 2.12 kN/mm |
|  | Reduction rate | 1% | 1% |
|  | State of teeth | Excellent | Excellent |
|  | State of tooth bottom portion | Excellent | Excellent |
|  | Judgement | A | A |

TABLE 7

| | | Ex. 1 | Ex. 3 | Ex. 6 | Comp. Ex. 1 | Ex. 20 | Ex. 21 | Ex. 22 | Comp. Ex. 2 |
|---|---|---|---|---|---|---|---|---|---|
| Tension members | The number of tension members | 6 | | | | | 6 | | |
| | Diameter (D) of each tension member | 2.5 mm (raw cords = 84) | | | | | 2.5 mm (raw cords = 84) | | |
| | Strength of each tension member | 7.2 kN | | | | | 7.2 kN | | |
| | Pitch (P11) of tension members | 3.2 mm | | | | | 3.2 mm | | |
| | Interval (d) between tension members | 0.7 mm | | | | | 0.7 mm | | |
| Thermoplastic elastomer | Type | Polyester type polyurethane | | | | | Polyester type polyurethane | | |
| | Hardness (D type) | 50 | | | | | 50 | | |
| Reinforcing fabric (inner peripheral surface) | | Yes (66 nylon woven fabric having a thickness of 0.5 mm) | | | | | No | | |
| Type Size | Type of teeth | G14M | | | | | G14M | | |
| | Belt width (W) | 20 mm | | | | | 20 mm | | |
| | Height (H13) of belt teeth | 6.1 mm | | | | | 6.1 mm | | |
| | Pitch (P13) of belt teeth | 14 mm | | | | | 14 mm | | |
| | Belt width (W13) at central position (O) | 7.5 mm | | | | | 7.5 mm | | |
| Relation to pulley | Backlash (B) | 0.23 mm | | | | | 0.23 mm | | |
| | Proportion of backlash (B) to belt width (W13) at central position (O) | 3.0% | | | | | 3.0% | | |
| | Gap (S) | 0.25 mm | 0.5 mm | 0.8 mm | 0 mm | 0.25 mm | 0.5 mm | 0.8 mm | 0 mm |
| | Proportion of gap (S) to height (H13) of belt teeth | 4.1% | 8.2% | 13.1% | 0% | 4.1% | 8.2% | 13.1% | 0% |
| Running performance | Belt strength Before running | 2.19 kN/mm | 2.18 kN/mm | 2.17 kN/mm | 2.18 kN/mm | 2.17 kN/mm | 2.19 kN/mm | 2.18 kN/mm | 2.18 kN/mm |
| | After running | 2.16 kN/mm | 2.15 kN/mm | 2.15 kN/mm | 1.11 kN/mm | 2.15 kN/mm | 2.16 kN/mm | 2.15 kN/mm | 0.99 kN/mm |
| | Reduction rate | 1% | 1% | 1% | 49% | 1% | 1% | 1% | 55% |
| | State of teeth | Excellent | Excellent | Good | Good | Good | Excellent | Good | Good |
| | State of tooth bottom portion | Good | Excellent | Excellent | Poor | Good | Excellent | Excellent | Poor |
| | Judgement | B | A | B | C | B | A | B | C |

In the running test, a test piece 10x having a width of 20 mm and a length of 3,000 mm was picked from each toothed belt according to Examples 1 to 22 and Comparative Examples 1 to 2. As illustrated in FIG. 4, a weight 71 (1,250 N) and a weight 72 (7,000 N) were suspended respectively at both ends of the test piece 10x, which was wound around a drive pulley 73, a driven pulley 74 (the number of teeth of pulleys 73 and 74=44) and a flat pulley 75 (diameter=160 mm) of a lift tester 70. The running was repeated for 1,200,000 cycles (one reciprocation in the direction indicated by an arrow in FIG. 4 marks one cycle) at a movement distance of 1,000 mm, so as to evaluate the states of belt teeth and belt tooth bottom portions after the running test (see items "state of belt teeth" and "state of belt tooth bottom portions" in Table 1 to Table 7). In the evaluations of "state of belt teeth" and "state of belt tooth bottom portions" in Table 1 to Table 7, "Excellent" means no wear, "Good" means occurrence of wear to an extent of no problem in practical durable life, and "Poor" means occurrence of remarkable wear to an impractical extent.

In the tensile test, a test piece having a width of 20 mm and a length of 500 mm was picked from each toothed belt according to Examples 1 to 22 and Comparative Examples 1 to 2. Each test piece was subjected to the tensile test (tensile speed of 50 mm/min) by using an Amsler tensile tester, and the belt strength until breakage was measured. The measurement was performed before and after the above-mentioned running test (see items "Before running" and "After running)" of "Belt strength" in Table 1 to Table 7).

From results of the running test and the tensile test, each of the toothed belts according to Examples 1 to 22 and Comparative Examples 1 to 2 was ranked A to C according to criteria shown in Table 8 below and described in items "Judgement" in Table 1 to Table 7.

[Table 8]

TABLE 8

| Rank | Determination criteria |
|---|---|
| A | Belt strength maintained at 2.0 kN/mm or more even after running and both states of "belt teeth" and "belt tooth bottom portions" being excellent (determined Excellent) |
| B | Belt strength being 1.85 kN/mm or more and less than 2.0 kN/mm after running although both states of "belt teeth" and "belt tooth bottom portions" being excellent (determined Excellent) Or slight wear (determined Good: level of no problem in practical durable life) observed on at least one of "belt teeth" and "belt tooth bottom portions" although belt strength maintained at 2.0 kN/mm or more even after running |
| C | Impractical due to belt strength being less than 1.85 kN/mm after running, wearing (determined Poor) of belt teeth, or wearing (determined Poor) of belt tooth bottom portions |

Examples 2 to 5 were all ranked A among Examples 1 to 6 in which the gap S was provided between tip ends of pulley teeth and belt tooth bottom portions. Example 1 having the smallest gap S was ranked B since the belt tooth bottom portions slightly wore. As the gap S set larger, the belt tooth bottom portions would not come into contact with the pulley teeth when meshing with the pulley teeth. Accordingly, belt teeth received the stress applied to the toothed belts more and more intensively (in the case where the belt tooth bottom portions were in contact with the pulley teeth, the stress was dispersed in the belt teeth and the belt tooth bottom portions). Therefore, Example 6 having the largest gap S was ranked B since the stress was likely to be concentrated on the belt teeth and the belt teeth was likely to wear due to contact with the pulley teeth.

Comparative Example 1 was the case where no gap S was provided between the tip ends of the pulley teeth and the belt tooth bottom portions and thus, was ranked C since the belt tooth bottom portions severely wore.

Examples 7 to 11 provided large (the pitch P13 of belt teeth was 14 mm, the pitch P13 of belt teeth was relatively large, so that the scale (length of the belt teeth in a belt longitudinal direction and the height H13 of the belt teeth) of the belt teeth was large accompanied with the pitch P13 of belt teeth) and highly-powerful toothed belts having the same constitutions as in Example 3 except that the backlash B was varied. Examples 9 and 10 were ranked A as was in Example 3, while Examples 7 and 8 each having a small backlash were ranked B since wear occurred on the belt teeth due to the interference between pulley teeth and belt teeth. Example 11 having a large backlash was ranked B since wear occurred on the belt teeth due to the interference between pulley teeth with belt teeth accompanied with deformation of the belt teeth.

Examples 12 and 13 were large and highly-powerful toothed belts each having the same constitution with Example 3, were toothed belts where a tooth scale (length of belt teeth in a belt longitudinal direction and the height H13 of the belt teeth) was increased, and were ranked A as was in Example 3.

Examples 14 to 16 provided large (the pitch P13 of belt teeth was 14 mm) and highly-powerful toothed belts each having the same constitution with Example 3 except that the hardness of a material (polyurethane thermoplastic elastomer) forming the toothed belts was changed. Example 14 (hardness: 30°) was ranked B since in the toothed belt having a small hardness, wear of the belt teeth was likely to progress due to deformation of the belt teeth.

Examples 17 and 18 provided large (the pitch P13 of belt teeth was 14 mm) and highly-powerful toothed belts each having the same constitution with Example 3 except that the pitch P11 of tension members was changed (increased) and the number of tension members embedded in the toothed belts was reduced. The belt strength were lower than that in Example 3 due to the reduction in the number of tension members. However, the belt strength was maintained at 1.85 kN/mm or more even after running and neither the belt teeth nor belt tooth bottom portions wore, and thus rank B was marked.

Example 19 provided a large (the pitch P13 of belt teeth was 14 mm) and highly-powerful toothed belt having the same constitution with Example 3 except that the type of a material (thermoplastic elastomer) forming the toothed belt was changed. The toothed belt in Example 19 in which a polyester thermoplastic elastomer was used as the forming material was ranked A as was in Example 3 (polyurethane thermoplastic elastomer).

Comparative Example 2 provided a toothed belt in which no gap S was provided and belt tooth bottom portions were not covered with a reinforcing cloth. The toothed belt in Comparative Example 2 was ranked C since the belt tooth bottom portions wore most severely. The toothed belt in Comparative Example 1 in which no gap S was provided but belt tooth bottom portions were covered with a reinforcing cloth, was also ranked C since the belt tooth bottom portions could not be prevented from wearing. Therefore, it was found that providing the gap S in belt tooth bottom portions as in Examples 1 to 22 was effective in preventing wearing of the belt tooth bottom portions and improving durability of the toothed belts.

Compared with Examples 1, 3, and 6, Examples 20, 21, and 22 were toothed belts in which no reinforcing fabric was provided on an inner peripheral surface of the toothed belts (surfaces of belt teeth and surfaces of belt tooth bottom portions). It was found that there was no significant difference in the wear state of belt teeth or the belt tooth bottom portions in the running test. There was little influence of the presence or absence of the reinforcing fabric on the wear of the belt tooth bottom portions, and the wear was prevented relatively in the belt teeth provided with the reinforcing fabric (however, both were ranked the same in the determination of the present test).

A preferred embodiment of the present invention has been described above. However, the present invention is not limited to the above-described embodiment and various design modifications can be made within the range described in the scope of the claims.

The toothed belt power-transmission device according to the present invention is not limited to be used in a device for adjusting an angle of a blade in a wind power generator, an elevation-conveying device, or the like, and can be used in an arbitrary device.

The toothed belt may be open-ended or endless.

The thermoplastic elastomer forming the back surface portion and the plurality of belt teeth of the toothed belt is not limited to the polyurethane thermoplastic elastomer, and may be, for example, a polyester thermoplastic elastomer, a polystyrene thermoplastic elastomer, a polyolefin thermoplastic elastomer, a polyamide thermoplastic elastomer, or a vinyl chloride thermoplastic elastomer, or may be a combination of two or more kinds thereof. The hardness of the thermoplastic elastomer is not limited to 38 to 53°, and may be out of this range.

The tension member of the toothed belt is not limited to be formed of a steel cord, and may be, for example, formed of a cord obtained by twisting at least one of an aramid fiber and a carbon fiber.

This application is based on Japanese Patent Application 2017-106153 filed on May 30, 2017, and Japanese Patent Application 2018-96312 filed on May 18, 2018, contents of which are incorporated by reference herein.

REFERENCE SIGNS LIST 10 toothed belt
10a belt main body
11 tension member
12 back surface portion
13 belt tooth
14 belt tooth bottom portion
15 reinforcing fabric
50 toothed pulley
53 pulley tooth
54 pulley tooth bottom portion
d interval between tension members
D diameter of tension member
H13 height of belt tooth
P13 pitch of belt tooth
P11 pitch of tension member
W13 width of belt tooth
S gap
B backlash
O central position

The invention claimed is:

1. A toothed belt power-transmission device comprising:
a toothed belt having belt teeth and belt tooth bottom portions formed alternately; and
a toothed pulley having pulley teeth and pulley tooth bottom portions formed alternately to be configured to mesh with the toothed belt,
wherein tip ends of the belt teeth are in contact with the pulley tooth bottom portions, wherein the belt teeth has a pitch of 14 mm or more, and wherein the belt teeth has a height of 5 mm or more, and
wherein tip ends of the pulley teeth are not in contact with the belt tooth bottom portions to provide a gap between the tip ends of the pulley teeth and the belt tooth bottom portions wherein the gap is 5 to 11% of a height of the belt teeth.

2. The toothed belt power-transmission device according to claim 1,
wherein at a central position of the belt teeth in a height direction of the belt teeth, a backlash of 2.5 to 3.5% of a width of the belt teeth at the central position is provided between the belt teeth and the pulley teeth.

3. The toothed belt power-transmission device according to claim 1,
wherein the toothed belt comprises a back surface portion opposite to the belt teeth in a height direction of the belt teeth, and a plurality of tension members embedded in the back surface portion, and
wherein each of the plurality of tension members comprises a steel cord or a cord obtained by twisting at least one of an aramid fiber and a carbon fiber.

4. The toothed belt power-transmission device according to claim 3,
wherein each of the plurality of tension members:
comprises a steel cord,
has a strength of 7 to 8 kN, and
has a diameter of 2.3 to 2.6 mm.

5. The toothed belt power-transmission device according to claim 4,
wherein the plurality of tension members have a pitch of 3.0 to 3.7 mm, and
wherein the plurality of tension members have an interval therebetween of 0.4 to 1.4 mm.

6. The toothed belt power-transmission device according to claim 3,
wherein the back surface portion and the belt teeth are integrally formed of a thermoplastic elastomer, and the thermoplastic elastomer comprises at least one selected from the group consisting of polyurethane thermoplastic elastomers, polyester thermoplastic elastomers, polystyrene thermoplastic elastomers, polyolefin thermoplastic elastomers, polyamide thermoplastic elastomers, and vinyl chloride thermoplastic elastomers.

7. The toothed belt power-transmission device according to claim 3,
wherein the back surface portion and the belt teeth are integrally formed of a thermoplastic elastomer that is a polyurethane thermoplastic elastomer and has a hardness of 38 to 53°.

8. The toothed belt power-transmission device according to claim 1,
wherein the toothed belt has a belt strength of 1.85 kN or more per 1 mm of a belt width.

9. The toothed belt power-transmission device according to claim 1,
wherein a reinforcing cloth is disposed on surfaces of the belt teeth and surfaces of the belt tooth bottom portions.

* * * * *